3,101,442
TRANSISTORIZED DIRECT-VOLTAGE REGULATED POWER SUPPLY
Arthur M. Darbie, South Plainfield, Charles W. Harrison, Millington, and Donald J. Tighe, Millburn, N.J., assignors to Hewlett-Packard Company, Palo Alto, Calif., a corporation of California
Filed Dec. 15, 1959, Ser. No. 859,633
11 Claims. (Cl. 323—22)

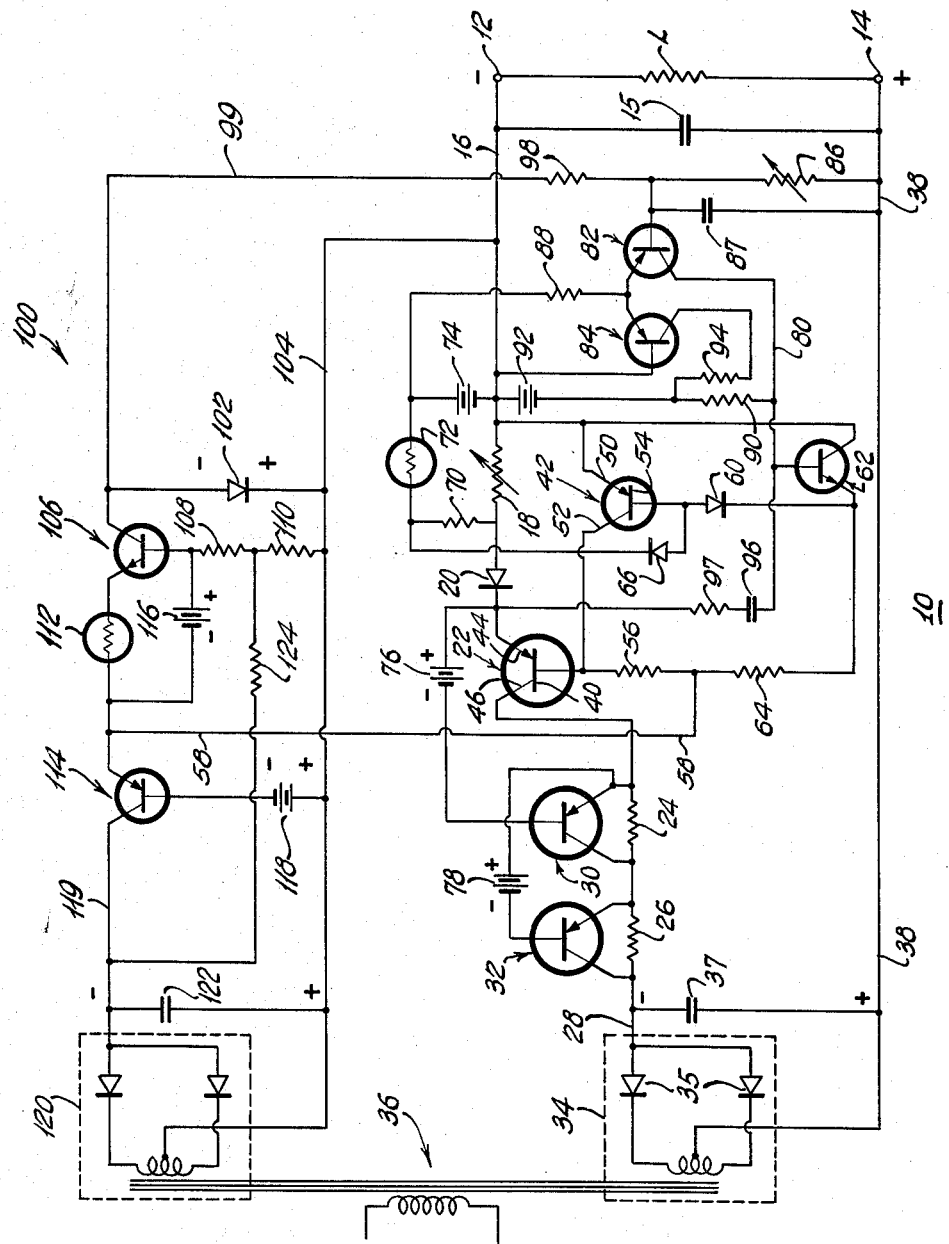
INVENTORS
ARTHUR M. DARBIE
CHARLES W. HARRISON
BY DONALD J. TIGHE
Curtis, Morris & Safford
ATTORNEYS

United States Patent Office 3,101,442
Patented Aug. 20, 1963

This invention relates to a highly regulated direct voltage power supply.

An object of this invention is to provide an improved all transistor circuit for closely regulating an output voltage.

Another object is to provide a circuit of this kind which is self-protecting so that upon overload or short circuit, the easily damaged transistors will not be harmed.

A more specific object is to provide an all transistor voltage regulating circuit having substantially improved heat dissipating characteristics so that the circuit can be built into a very compact unit.

Still another object is to provide a circuit of this kind which is simpler and less expensive in construction but yet which operates as effectively and efficiently as previous circuits.

These and other objects will in part be understood from and in part pointed out in the description given hereinafter.

In regulating a direct output voltage from an unregulated source it is customary to amplify variations in the output voltage and then apply these amplified variations in proper phase to a control element which corrects the output voltage and keeps it within close limits of a set value. One common kind of control element is a vacuum tube or tubes connected as a resistance in series with the source and the output voltage terminals, the grid or control electrode of the tube being changed in potential as required to keep the output voltage substantially constant.

A circuit using vacuum tubes in this way to regulate a voltage is well suited to applications requiring relatively very fast and exact regulating action. However, because vacuum tubes operate with heated filaments, they must be replaced from time-to-time when they burn out and they require appreciable stand-by power even at no load, thus lessening the power efficiency of the over-all regulating circuit in which they are used. For such reasons, therefore, it is desirable to use transistors in regulators intended for many applications.

Among the limitations of transistors is their susceptibility to damage or destruction by too great voltage or current or by excessive internal power dissipation. Moreover, under widely varying loads the internal heating of a transistor will change and cause a consequent drift in its amplification characteristics. In spite of these drawbacks, because of their compactness and long life, the possibility of operation without a heated cathode, and of operating efficiently with low voltages, the use of transistors in voltage regulators for many applications appears highly desirable.

Several difficulties, however, are encountered in an all-transistor circuit when one tries to regulate the direct output voltage all the way down to zero at full load current. Present day transistors are very sensitive to over-voltage and are quickly destroyed if the voltage across them exceeds their rated value. This value is frequently under 50 volts maximum. However, this is a maximum rating only for no current through the transistor; with appreciable current flow, the maximum permissible voltage across the transistor is far less, being determined by the maximum internal power dissipation or heating of the transistor. Now, at full load current and nearly zero regulated output voltage, the main regulating transistor or transistors in the circuit are subjected to the full input power. Thus, for example, with a circuit having an input voltage of 30 volts and a full load current of 2 amperes, the regulating transistors are called upon to dissipate almost 60 watts of power when the output voltage is set near zero at full load current, whereas they have to dissipate only about 10 watts when the output voltage is set at 25 volts, for example. To avoid this difficulty, it has been the usual practice to decrease the input voltage to the circuit at the same time that the output voltage was set to a lower value. In this way, the power dissipation within the regulating transistors could be kept to a more nearly constant value, this being an economy in terms of the number and size of the regulating transistors. However, in many installations it is necessary to control the output voltage of a number of power supplies simultaneously from a remote location, and it is highly desirable from the standpoint of simplicity and cost that each supply not have to have its input voltage varied simultaneously along with the output voltage. Also, if the unregulated input voltage of a supply could be left nominally constant, this would eliminate bulky and expensive elements, such as variable transformers or controllable magnetic amplifiers which are required to vary this voltage. The present invention provides an all-transistor circuit wherein the input voltage need not be changed when the output voltage is changed. The regulating transistors in this circuit, moreover, are efficiently used and are thoroughly protected against burnout by short circuits in the load, for example. The transient stability of the circuit is excellent and ripple or hum in the output voltage is greatly reduced.

Under operating conditions the main regulating transistors of a voltage regulating circuit must dissipate internally a certain amount of power. This of course causes undesirable heating of the transistors. In the case of a germanium transistor if its temperature exceeds about 85° C. its efficiency and life will be seriously impaired. Thus, special provision must be made to remove as much of the internal heat as possible from these main regulating transistors. It is therefore customary practice in a transistorized voltage regulator to mount the main regulating transistors on one or more heat radiating structures, called heat sinks, which conduct the heat away from the transistors and dispose of it by radiation and convection. Even so, where the load handled by the main transistors is relatively large, it is advisable in addition to using a large heat sink to blow a draft of cold air over the heat sink to further aid the removal of heat. The present invention provides a circuit wherein the main regulating transistors are operated in a way that materially reduces the maximum amount of heat which must be dissipated in them at any given time for a given load. Thus, the problem of heat removal is greatly alleviated and moreover this circuit can be built on a smaller chassis without sacrifice in load or power handling ability.

In previous transistor voltage regulating circuits, to maintain a high degree of regulation, sufficient stability, and protection against burnout due to overload or short circuit, it was necessary to use a goodly number of auxiliary transistors in conjunction with the main regulating power transistors. The present invention provides a circuit wherein the number of these auxiliary transistors is reduced but yet the efficiency and effectiveness of the circuit is maintained at a high level. This means that this circuit can be built at lower cost and that it will operate with even greater reliability due to the smaller number of elements.

In accordance with the present invention, in one specific embodiment thereof, a main regulating transistor and two voltage dropping resistors are connected in series between a nominally constant input direct-voltage source (such as a rectifier and fixed transformer) and an output lead. The voltage on the output lead is sensed and compared to a reference source by an all-transistor feedback amplifying network which controls the main regulating transistor to keep the output voltage constant at a set value.

The voltage dropping resistors in series with the main regulating transistors in the present circuit are each shunted by an auxiliary regulating transistor which is operated as a variable switch to control and limit the power dissipation in the main regulating transistor. The first of these auxiliary transistors begins to conduct when the voltage across the main regulating transistor begins to drop below a given value. Then, as soon as the voltage drop across the first auxiliary regulating transistor decreases to a given value, the second auxiliary regulating transistor begins to conduct. The main and the two auxiliary regulating transistors are mounted on a single heat sink but, as will be explained in detail hereinafter, the maximum power which must be dissipated at any one time in the heat sink is substantially less than it would be if the main regulating transistor were used by itself with no auxiliary regulating transistors and no series voltage dropping resistors. This circuit is also an improvement over the circuits shown in co-pending application Serial No. 777,959, now issued as Patent No. 2,981,884, wherein a single resistor and shunt transistor are used in series with the main regulating transistor.

These two auxiliary regulating transistors are coupled to each other and to the main regulating transistor by simple and unique circuitry, and the main regulating transistor is in turn operated by a driver transistor which is arranged so that when the output load current exceeds a given value the main regulating transistor is controlled to limit the current through it and is thereby protected against damage. The reference source connected to the feedback amplifying network to control the output voltage of the circuit is uniquely arranged so that it is effectively immune to changes in temperature or to any variation in power line voltage. Thus more accurate regulation in the output direct voltage of the circuit is obtained.

A better understanding of the invention together with a full appreciation of its many advantages will best be gained from the following detailed description given in connection with the single FIGURE of the drawing which shows a specific voltage regulating circuit embodying the invention.

The drawing shows a regulated voltage supply circuit 10 which has two output voltage terminals 12 and 14, upper terminal 12 being negative relative to the lower terminal 14. An external load, represented by resistor L, is adapted to be connected to these terminals as indicated. A large filter capacitor 15 is internally connected in conventional way between these terminals. Terminal 12 is energized by an output lead or conductor 16 which in turn is connected through a small current sensing resistor 18, a silicon diode 20, a main regulating transistor 22, a first voltage dropping resistor 24 and a second voltage dropping resistor 26 to a direct-voltage input lead 28. Resistor 24 is shunted by an auxiliary regulating transistor 30 and resistor 26 is shunted by an auxiliary regulating transistor 32 to be described in detail later. These transistors 30 and 32 have power handling capabilities similar to those of main transistor 22. Input 28 connects to the negative side of a supply source 34, schematically indicated as rectifiers 35 and a winding on a transformer 36. This source 34 is shunted by a large filter capacitor 37. A return current path from voltage source 34 to output terminal 14 is provided by a conductor 38.

When a load is applied across the output terminals 12 and 14 and increased current drawn therefrom, a drop in voltage across these terminals which would normally otherwise occur is compensated for by an appropriate change in the voltage drop across main regulating transistor 22 or under certain conditions to be described shortly by a decrease in the voltage drop across first resistor 24 which keeps the voltage drop across transistor 22 above a pre-determined value. The voltage drop across second resistor 26 begins to decrease also when the voltage across first resistor 24 drops below a given value. This dual action will be explained shortly in detail. The advantages of this plural resistor and shunt transistor arrangement over a single resistor-transistor, or none at all, are a substantial decrease in the sum of the powers which must be dissipated in the shunt transistors and in the main regulating transistor for any particular load voltage and current, and a substantial reduction in output hum or ripple where a transformer-rectifier input is used (as illustrated). Even so, the output voltage in this circuit can still be regulated to very tight tolerances, of the order of 0.01%.

Direct voltage control signals in proper phase and amplitude necessary to maintain the output voltage on lead 16 and terminal 12 substantially constant at a set value relative to terminal 14 are applied to main transistor 22 through its base electrode 40 by a driver transistor 42, which, because of the advantageous arrangement of this circuit, need have only low power handling ability. A negative increase in the potential of base electrode 40 relative to the emitter 44 of transistor 22 causes an increased current flow between emitter 44 and the collector electrode 46, thus in effect lowering the series resistance of this transistor and acting to increase the potential difference between the output terminals 12 and 14, that is, to make terminal 12 more negative relative to terminal 14.

The energizing voltage for driver transistor 42 which must be applied across its emitter 50 and its collector 52 for linear operation in response to a drive signal applied to its base 54 is obtained primarily from the voltage developed across silicon diode 20 which thus takes the place of a battery. The voltage drop across resistor 18 is small since it has only a small value of resistance. The collector of driver transistor 42 is directly connected to base 40 of main regulating transistor 22. These electrodes in turn are connected in common to a load resistor 56 whose other end is connected to a negative voltage supply lead 58. Thus, driver transistor 42 need handle only a relatively small current to control a large current through main transistor 22. This means that a transistor having high gain, and better frequency response can be used, which in turn improves the transient response of the circuit.

Driver transistor 42 is controlled, so that it can in turn control main transistor 22, by a signal current drawn from its base 54 through a diode 60. The latter is connected to the emitter of an amplifier transistor 62, this emitter being connected through a load resistor 64 to a negative voltage lead 58. Increase or decrease in the current drawn through diode 60 will cause a proportional change in the current through driver transistor 42 and will thus control the main regulating transistor. When driver transistor 42 is full on, main transistor 22 is off; when driver transistor 42 is nearly off, main transistor 22 is full on. In order to prevent the current through the main transistor from exceeding a maximum safe value, determined by the capabilities of the particular transistor used, the base of driver transistor 42 is controlled to limit the current through main transistor 22. To this end the base of transistor 42 is connected through a germanium diode 66, having a forward voltage drop across itself of about .03 volt, when conducting, to a variable bias network comprising a resistor 70, a temperature variable resistor 72 and a battery 74 connected in a loop in series with resistor 18. When the main load current through resistor 18 increases, its left end becomes more negative relative to its right end and there comes a point at which diode 66 begins to draw current from the base of driver transistor 42 and thereby limit the current through main transistor 22. During this limiting operation, diode 60 is non-conductive thus effectively isolating transistor 62 from transistor 42. Resistor 18 is made adjustable so that the point at which current limiting begins can be set at a desired value. The temperature characteristics of resistor 72 are chosen to compensate for temperature variations in the characteristics of diode 66 and driver transistor 42.

As mentioned previously, auxiliary regulating transistor 30 begins to conduct when the collector-to-emitter voltage of main transistor 22 drops below a given value, for example, two volts. To this end, the base of transistor 30 is connected through a bias battery 76 to the emitter of transistor 22. Only a small decrease below the given value (e.g. 2 volts) of emitter-to-collector voltage across main transistor 22 causes auxiliary transistor 30 to turn full on. When transistor 30 begins to conduct it lowers the voltage drop across resistor 24, which action tends to hold the voltage transistor 22 at about the given minimum value (e.g. 2 volts). Similarly, when the emitter-to-collector voltage of auxiliary transistor 30 tries to drop below a minimum value (e.g. 2 volts) then auxiliary transistor 32 begins to turn on, the base of the latter being connected to the emitter of transistor 30 by a bias battery 78. If desired additional auxiliary regulating transistors operating in sequence after transistors 30 and 32 may be connected serially in circuit in the same way. The use of two or more auxiliary regulating transistors results in a substantial reduction in the amount of total power which must be removed from them and from main transistor 22 for any particular values of output voltage and current supplied by circuit 10. Thus for a given power handling capacity, the overall circuit can have a smaller "heat sink" and/or forced air blowing can be dispensed with. Additionally, because a plurality of relatively large series resistors 24 and 26 are used, output voltage ripple is reduced over what it would be if a smaller amount of such resistance were used. Even so, the transient response and the voltage regulating efficiency of this circuit are excellent.

As was mentioned, the signal which actuates driver transistor 42 to control main regulating transistor 22 is derived from transistor 62. The emitter of transistor 42 and the collector of transistor 62 are connected directly to lead 16 and the base electrode of transistor 62 is connected via a lead 80 to the collector electrode of a transistor 82. The latter comprises one side of a differential amplifier, the other side of which comprises a transistor 84. Minute variations in the voltage maintained across the output voltage terminals 12 and 14 are sensed by transistor 82 through its base electrode which is direct-current connected to lead 38 via a low resistance rheostat 86. These variations are then amplified and applied to main regulating transistor 22 in proper phase to keep the output voltage constant at a value determined by the setting of rheostat 86. The latter is shunted by a small filter capacitor 87. The emitter electrodes of transistors 82 and 84 are connected to each other and to a resistor 88 which is connected to the positive side of battery 74. The collector of transistor 82 is connected to a load resistor 90 whose upper end is connected to the negative side of a battery 92. The collector of transistor 84 is connected in similar fashion through a load resistor 94 to battery 92. The base of transistor 84 is directly connected to lead 16. To insure transient stability, the base of transistor 62 is connected to the emitter side of main transistor 22 by a filter comprising a capacitor 96 and a resistor 97.

The junction of rheostat 86 and the base of transistor 82 is connected via a resistor 98 and a lead 99 to a constant voltage source, generally indicated at 100 and by adjusting the resistance of the rheostat, the voltage on lead 16 can be changed to a different value at which it will be regulated.

Constant voltage source 100 comprises a reference Zener diode 102 connected between lead 99 and a lead 104 which is in turn connected to lead 16. This diode is supplied in reverse direction with an effectively constant current by a transistor 106 the base of which is connected through a resistor 108 and a resistor 110 to lead 104. The current supplied to diode 102 is chosen in magnitude (e.g. 10 ma.) to give the most nearly constant voltage drop across the diode. Thus by keeping this current constant the voltage across the diode will remain very nearly absolutely constant. Transistor 106 is connected in a common base configuration with its emitter connected through a temperature compensating resistor 112 to the junction of lead 58 with the emitter of a transistor 114, the voltage at this junction being referenced to the base of transistor 106 through a bias battery 116. The base of transistor 114 is connected to lead 104 through a bias battery 118 and its collector is connected to the negative lead 119 of a power supply 120, similar to supply 34 but supplying less current. A large filter capacitor 122 is connected between leads 104 and 119.

The voltage at lead 119 relative to lead 104 is nominally constant but will vary with changes in the input voltage supplied to transformer 36. To compensate for the effect of these changes on the voltage at lead 99, lead 119 is connected through a resistor 124 to the junction of resistors 108 and 110. Thus, changes in the voltage at lead 119 are applied in proper amount and correct phase to transistor 106 so that the current supplied to Zener diode 102 remains almost absolutely constant. Thus the voltage on lead 99 remains independent of the voltage on lead 119 within a wide range.

In a circuit which has been built and successfully operated, the voltage supplied to lead 28 was nominally constant at −23 volts; the maximum load current was 1.5 amp.; the maximum load voltage was 15 volts; resistor 18 was about 1 ohm; resistor 24, 22 ohms; resistor 26, 12 ohms; diode 20, type SM72; diode 66, type 1N279; diode 102, type 1N2163; transistor 22, type 2N1137; transistors 30 and 32, type 2N420; transistor 42, type 2N383; and batteries 74, 76 and 78, 2.1 volts each.

The following table gives actually measured voltages, currents and powers in the above circuit. In this table E is the output voltage between terminals 12 and 14; I is the load current in amperes; $V_1$ is the voltage drop across transistor 22, $P_1$ is the power dissipated in it; $V_2$ is the voltage drop across transistor 30, $P_2$ the power dissipated in it, $V_3$ is the voltage drop across transistor 32, $P_3$ is the power dissipated in it.

| E | I | $V_1$ | $P_1$ | $V_2$ | $P_2$ | $V_3$ | $P_3$ |
|---|---|---|---|---|---|---|---|
| 0 | 1.5 | 2 | 3 | 3 | 4.1 | 18 | 0 |
| 0 | 1.0 | 2 | 2 | 9 | 5.3 | 12 | 0 |
| 0 | 0.5 | 6 | 3 | 11 | 0 | 6 | 0 |
| 5 | 1.5 | 2 | 3 | 2 | 2.8 | 14 | 4.7 |
| 5 | 1.0 | 2 | 2 | 4 | 3.2 | 12 | 0 |
| 5 | 0.5 | 2 | 1 | 10 | 0.46 | 6 | 0 |
| 10 | 1.5 | 2 | 3 | 2 | 2.8 | 9 | 6.8 |
| 10 | 1.0 | 2 | 2 | 2 | 2.0 | 9 | 2.3 |
| 10 | 0.5 | 2 | 1 | 5 | 1.4 | 6 | 0 |
| 15 | 1.5 | 2 | 3 | 2 | 2.8 | 4 | 4.7 |
| 15 | 1.0 | 2 | 2 | 2 | 2.0 | 4 | 2.7 |
| 15 | 0.5 | 2 | 1 | 2 | 1.0 | 4 | 0.68 |

For any value of output voltage and current the power which must be dissipated internally in the circuit is the difference between the input voltage (23 volts) and the output voltage multiplied by the load current. Thus for $E=0$ and $I=1.5$, this power amounts to 34.5 watts. However for these values only 7.1 watts total ($P_1$, $P_2$, $P_3$) are dissipated in transistors 22, 30 and 32. The remainder of the power is dissipated in resistors 24 and 26 where it presents no heating problem. It will similarly be seen that for other values of load current and voltage the total power dissipated in transistors 22, 30 and 32 in each instance is considerably less than the maximum power dissipated in circuit 10. This means, of course, a corresponding saving in the size and complexity of the heat removal means, i.e. heat sink, required, this being achieved however without sacrifice in output voltage regulating ability or in transient response.

The above description is intended in illustration and not in limitation of the invention. Various changes or modifications in the embodiment illustrated may occur to those skilled in the art and these can be made without departing from the spirit or scope of the invention as set forth.

We claim:

1. A voltage regulating circuit having improved internal power dissipation characteristics, said circuit comprising an input direct-voltage terminal, a plurality of voltage dropping resistors connected in series therewith, an output lead, a main regulating transistor connected between said resistors and said lead, a feedback amplifier connected between said output lead and said main transistor and controlling it to keep the voltage on said lead constant at a set value, a plurality of auxiliary transistors connected to variably bypass current around respective ones of said resistors, and means interconnecting said auxiliary transistors and said main transistor to turn a first of said auxiliary transistors on when the voltage drop across said main transistor drops below a given value and to turn a second of said auxiliary transistors on when the voltage drop across said first auxiliary transistor drops below a certain value, whereby the power dissipated in said main and auxiliary transistors is substantially reduced below the maximum power input.

2. The circuit in claim 1 wherein said interconnecting means includes a first constant voltage bias means connected between an output electrode of said main transistor and a control electrode of said first auxiliary transistor, and a second constant voltage bias means connected between an output electrode of said first auxiliary transistor and a control electrode of said second auxiliary transistor.

3. The circuit in claim 1 wherein said output lead includes an output terminal and a silicon diode connected in series with said terminal and said main transistor, and said feedback amplifier includes a driver transistor having an output electrode connected to a control electrode of said main transistor, whereby the forward voltage drop across said diode provides a minimum operating potential for said driver transistor.

4. The circuit as in claim 3 wherein a current sensing resistor is connected between said main transistor and said output terminal in series with said diode, and reference bias means interconnecting said resistor and a control electrode of said driver transistor, whereby when the current through said resistor reaches a given value, it will be limited in magnitude.

5. A transistorized voltage-regulating circuit having a nominally constant input voltage and a widely adjustable output voltage and wherein the power dissipated in the regulating transistors is reduced, said circuit including an input terminal adapted to be supplied with a nominally constant direct voltage, an output terminal at which the voltage is to be regulated to very close limits of a desired setting, a main regulating transistor connected through low ohmage means in series with said output terminal, a plurality of relatively high ohmage voltage dropping resistors connected in series with said main regulating transistor and said input terminal, a like plurality of auxiliary regulating transistors each shunting a respective one of said resistors and adapted to variably conduit current in parallel with said resistors, means interconnecting said main and auxiliary transistors to cause a first one of said auxiliary transistors to conduit when the voltage across said main transistor drops to a given value and to cause a second one of said auxiliary transistors to conduit when the voltage across said first auxiliary transistor drops to a certain value, and feed back means including at least one amplifying transistor connected to sense variations in said output voltage and to apply signals to said main regulating transistor in proper phase and magnitude to keep said output voltage constant at a desired value, whereby the sum of the powers dissipated in said main and auxiliary regulating transistors is substantially reduced below the maximum power input to said circuit.

6. The circuit in claim 5 wherein said means interconnecting said main and auxiliary transistors comprises a first voltage bias conductive means connected between said main and first auxiliary transistors, and a second voltage bias conductive means connected between said first and second auxiliary transistors.

7. The circuit in claim 5 wherein said voltage dropping resistors have values greater than about 10 times the value of said low ohmage means.

8. A reference signal supply for operation on line signal, said supply comprising:

means connected to receive said line signal for producing an unidirectional voltage on a pair of conductors;

a Zener diode having one terminal connected to one of said conductors;

a transistor having first and second electrodes forming an input circuit and having second and third electrodes forming an output circuit;

means including the output circuit of said transistor to apply the unidirectional voltage on the other of said conductors to the other terminal of said Zener diode;

the amplitude and polarity of the voltage applied to said Zener diode being sufficient to establish high conductivity in the reverse conduction region;

means producing a potential difference between the first and second electrodes;

a resistor having end terminals and connecting said first electrode and said one conductor;

means to apply the signal on said other conductor to said resistor at a point intermediate the end terminals thereof;

and means to derive the reference signal from the voltage across said Zener diode.

9. A reference signal supply for operation on line signal, said supply comprising:

means connected to receive said line signal for producing an unidirectional voltage on a pair of conductors;

a Zener diode having one terminal connected to one of said conductors;

first and second transistors each having first and second electrodes forming an input circuit and having second and third electrodes forming an output circuit;

means including the first transistor connected in the common collector configuration and having the output circuit thereof connected in series with other of said conductors;

battery means connecting the base electrode of the first transistor to said one conductor;

means including the output circuit of the second transistor for applying the unidirectional voltage appearing on the emitter electrode of the first transistor to the other terminal of said Zener diode;

the amplitude and polarity of the voltage on said Zener diode being sufficient to establish high conductivity in the reverse conduction region, means producing a potential difference between the first and second electrodes of the second transistor;

a resistor having end terminals and connecting said first electrode of the second transistor and said one conductor;

means to apply the signal on said other conductor to said resistor at a point intermediate the end terminals thereof;

and means to derive the reference signal from the voltage across said Zener diode.

10. A reference signal supply for operation on line signal, said supply comprising:

means connected to receive said line signal for producing an unidirectional voltage on a pair of conductors;

a Zener diode having one terminal connected to one of said conductors;

first and second transistors each having first and second electrodes forming an input circuit and having second and third electrodes forming an output circuit;

means including the first transistor connected in the common collector configuration and having the output circuit thereof connected in series with other of said conductors;

battery means connecting the base electrode of the first transistor to said one conductor;

a temperature-sensitive resistor;

means serially connecting said temperature-sensitive resistor and the output circuit of the second transistor between the emitter electrode of the first transistor and the other terminal of said Zener diode;

the amplitude and polarity of the voltage on said Zener diode being sufficient to establish high conductivity in the reverse conduction region, means producing a potential difference between the first electrode of the second transistor and the second electrode of the first transistor;

a resistor having end terminals and connecting said first electrode of the second transistor and said one conductor;

means to apply the signal on said other conductor to said resistor at a point intermediate the end terminals thereof;

and means to derive the reference signal from the voltage across said Zener diode.

11. A voltage regulating circuit comprising an input lead adapted to be supplied with a direct voltage, an output lead adapted to supply a load with a closely regulated voltage, a main regulating transistor connected to said input lead, a voltage-dropping diode, a current-sensing resistor, a series circuit including said voltage-dropping diode and said current-sensing resistor and connecting said main transistor and said output lead, a feedback amplifier connected between said output lead and said main transistor for controlling said main transistor to maintain the voltage on said output lead constant, said amplifier including a driver transistor having an output electrode connected to the control electrode of said main transistor and having another output electrode connected to said output lead, reference bias means so connecting said current-sensing resistor and the control electrode of said driver transistor as to limit the current through said main transistor to a maximum value, and a load resistor connected between the control electrode of said main transistor and a bias voltage, whereby said driver transistor need handle only a small current to control a large current through said main transistor, and the transient response of said circuit is improved.

References Cited in the file of this patent

UNITED STATES PATENTS

| | | |
|---|---|---|
| 2,751,549 | Chase | June 19, 1956 |
| 2,896,151 | Zelinka | July 21, 1959 |
| 2,903,640 | Bixby | Sept. 8, 1959 |
| 2,981,884 | Tighe | Apr. 25, 1961 |

OTHER REFERENCES

Designing Transistor Circuits-D.C. Regulators, R. B. Hurley, Electronic Equipment, April 1957, pp. 20–23.